Sept. 20, 1960     E. E. SIVACEK     2,953,026
SPEEDOMETER
Filed Oct. 18, 1955     3 Sheets-Sheet 1
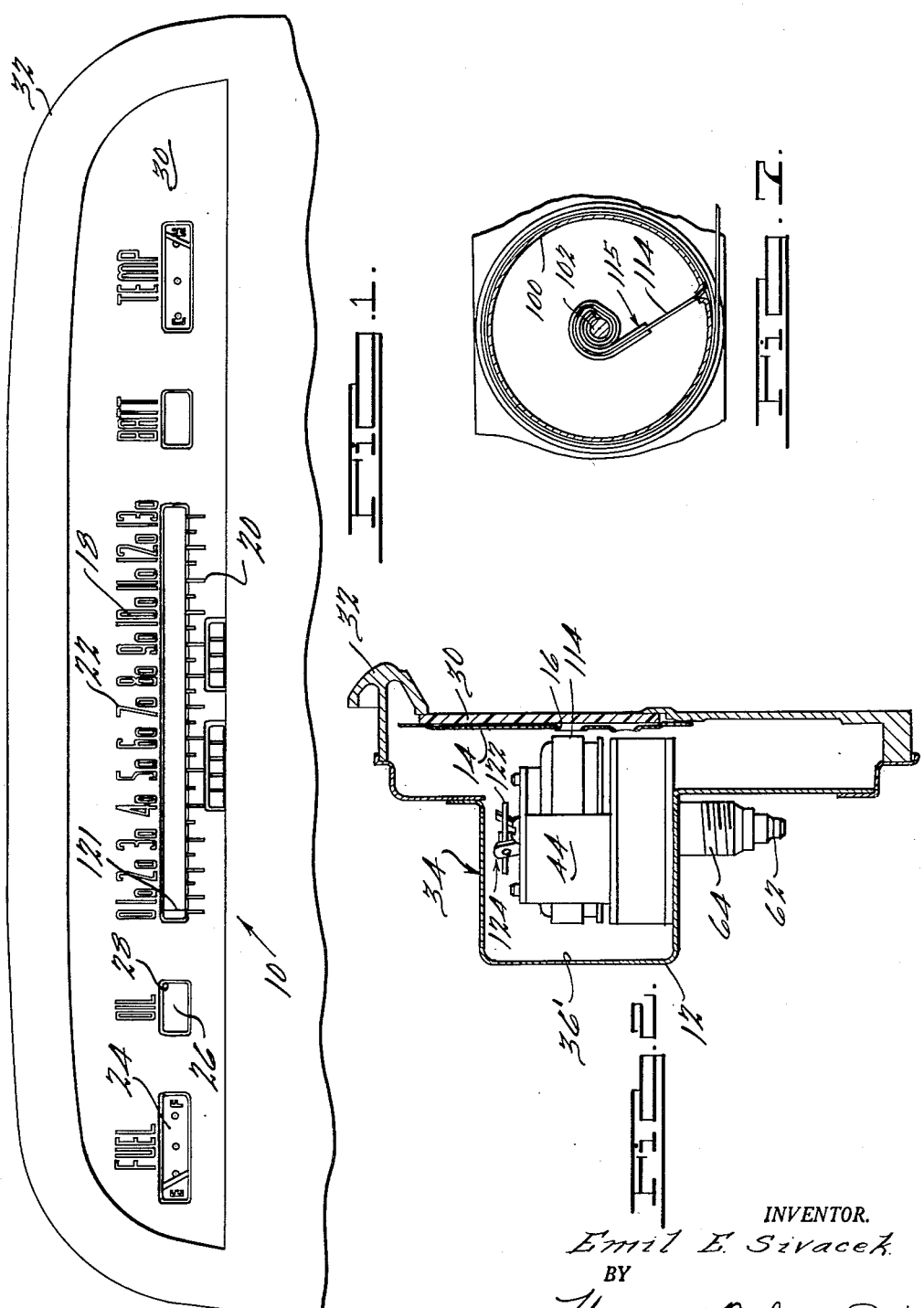
INVENTOR.
Emil E. Sivacek
BY
Harness, Dickey & Pierce
ATTORNEYS Sept. 20, 1960   E. E. SIVACEK   2,953,026
SPEEDOMETER
Filed Oct. 18, 1955   3 Sheets-Sheet 2
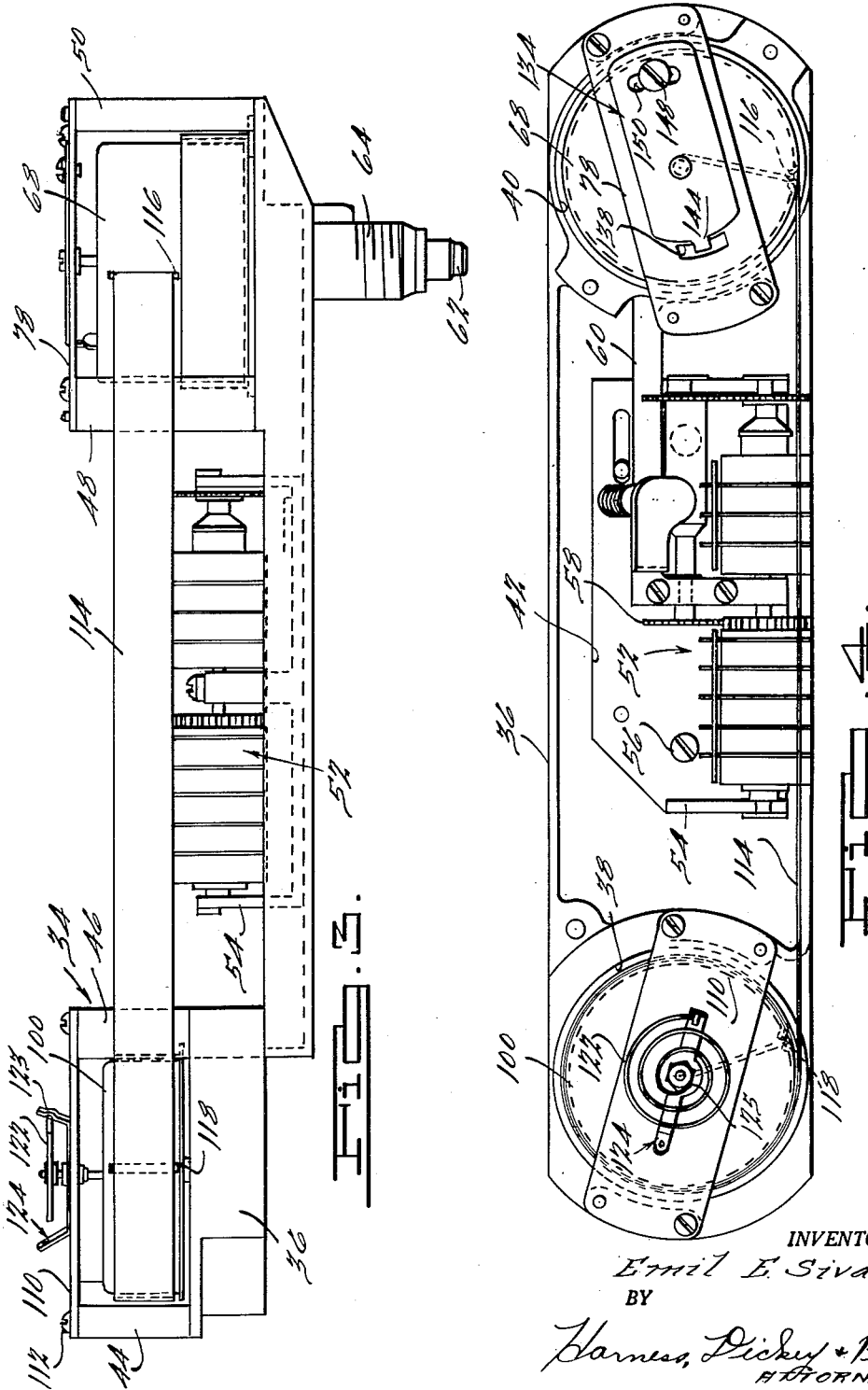
INVENTOR.
Emil E. Sivacek.
BY
Harness, Dickey & Pierce
ATTORNEYS.

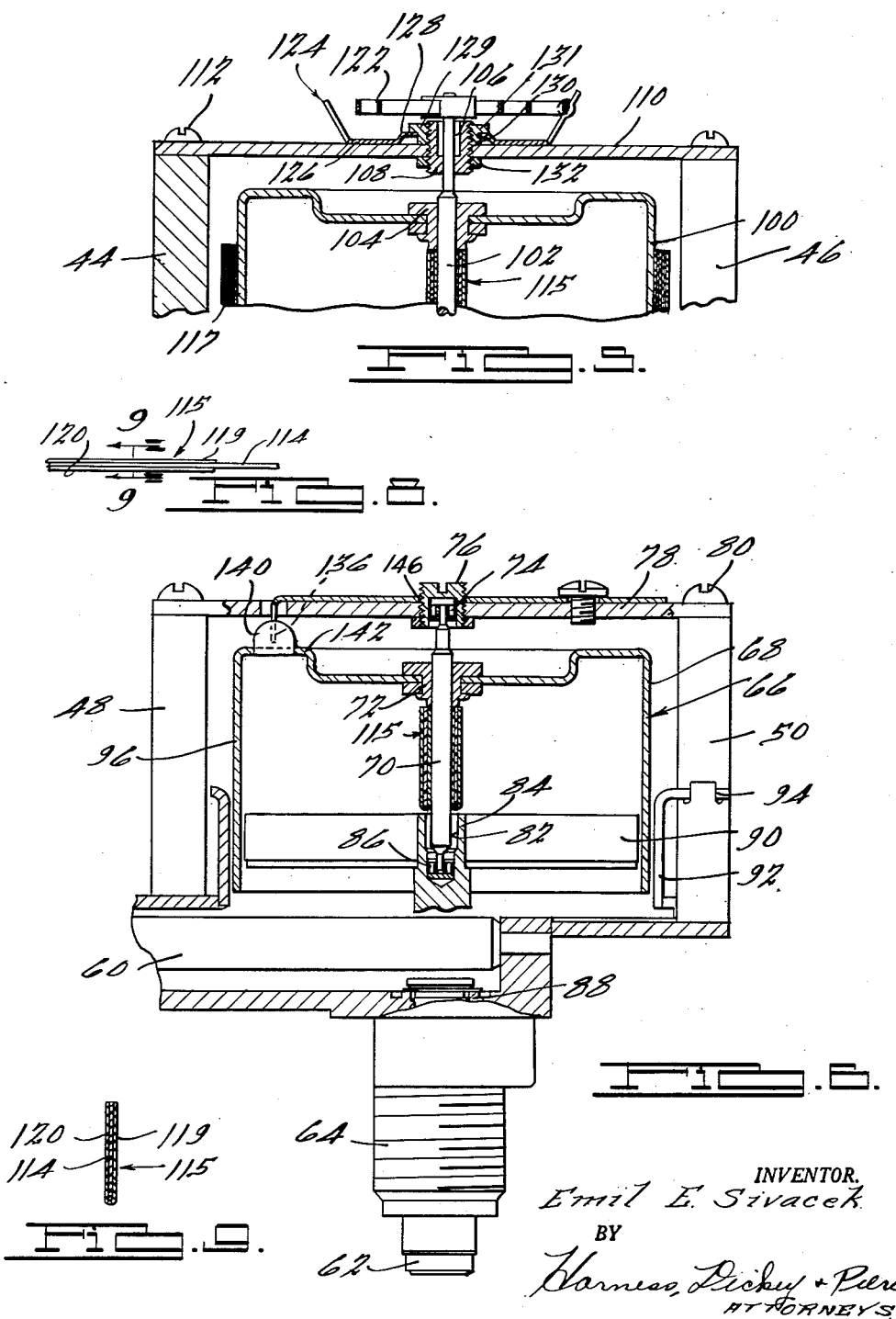

United States Patent Office 2,953,026
Patented Sept. 20, 1960

2,953,026

SPEEDOMETER

Emil E. Sivacek, Ann Arbor, Mich., assignor to King-Seeley Corporation, Ann Arbor, Mich., a corporation of Michigan Filed Oct. 18, 1955, Ser. No. 541,186

2 Claims. (Cl. 73—519)

This invention relates to indicating and measuring devices and, more particularly, to an improved speedometer for indicating and measuring the speed of a vehicle.

An object of the invention is to overcome disadvantages in prior indicating and measuring devices of the indicated character and to provide an improved indicating device incorporating improved means for translating a rotary motion to a rectilinear motion whereby the rectilinear motion is substantially proportional to the rotary motion.

Another object of the invention is to provide an improved indicating device incorporating improved means for translating a rotary motion to a rectilinear motion to effect a ribbon-type indication which may be associated with a rectilinear graduated scale.

Another object of the invention is to provide an improved indicating device incorporating an improved indicating member which provides a reference line that intersects an associated rectilinear scale at substantially right angles throughout any desired range of movement of the indicating member relative to the scale.

Another object of the invention is to provide an improved indicating device that is compact, pleasing in appearance, and readily discernible.

Another object of the invention is to provide an improved indicating device that is economical to manufacture and assemble, durable, efficient and reliable in operation, and which may be installed on an automotive vehicle with a minimum of labor and expense.

Another object of the invention is to provide an improved indicating device incorporating improved means for compensating the device for temperature changes.

Another object of the invention is to provide an improved indicating device incorporating improved means for stabilizing the device against oscillation under adverse conditions of vehicular motion.

The above as well as other objects and advantages of the invention will become apparent from the following description, the appended claims and the accompanying drawings wherein:

Figure 1 is a front elevational view of an automotive speedometer installation embodying the present invention;

Fig. 2 is a sectional side elevational view of the structure illustrated in Fig. 1;

Fig. 3 is a front elevational view of the speedometer illustrated in Figs. 1 and 2, with the dial plate removed therefrom;

Fig. 4 is a top plan view of the speedometer illustrated in Fig. 3;

Fig. 5 is a sectional view of the structure illustrated in Fig. 4, taken on the line 5—5 thereof;

Fig. 6 is a sectional view of the structure illustrated in Fig. 4, taken on the line 6—6 thereof;

Fig. 7 is a sectional view of the structure illustrated in Fig. 5, taken on the line 7—7 thereof;

Fig. 8 is an enlarged view of one end portion of the indicating member, showing the same prior to the assembly thereof; and Fig. 9 is a transverse sectional view of the structure illustrated in Fig. 8.

Referring to the drawings, the present invention is shown incorporated in an instrument panel installation, generally designated 10, particularly adapted for use on an automotive vehicle, although it will be understood that the present invention is applicable to other uses and to other types of indicating and measuring devices.

The instrument panel installation includes a mounting housing 12 which is adapted to be secured to the dash panel (not shown) or other mounting panel on the vehicle by any suitable or conventional means. A dial plate 14 is provided which defines an elongate substantially straight slot 16, and a rectilinear scale 18 is provided on the dial plate 14 adjacent the slot 16, the scale including substantially equally-spaced graduations 20 and suitable indicia 22 denoting uniform increments of speed. If desired, the installation 10 may also be provided with suitable gauges and signaling devices, such as 24 and 26, responsive to various operating conditions of the vehicle. For example, gauges and signaling devices responsive to the fuel level, oil pressure, engine temperature and battery condition may be mounted in the mounting housing 12, suitable apertures, such as 28, being provided in the dial plate 14 so that the operator of the vehicle may view the gauges and signaling devices and be apprised of the operating conditions of the vehicle.

A transparent closure 30 is provided for the installation in order to protect the speedometer and gauges from dust, dirt and other foreign matter, the closure 30 being disposed in spaced substantially parallel relationship with respect to the dial plate 14 and being retained by a molding 32 which also serves to provide a finished and pleasing appearance for the installation.

A speedometer, generally designated 34, is provided which is mounted in a chamber 36' defined by the mounting housing 12 and which is fixed to the mounting housing 12 by any suitable or conventional means. The speedometer 34 is comprised of a base 36 which is preferably formed of zinc or other suitable material having sufficient strength to withstand the forces exerted thereon. At a position near, but spaced from, the opposite ends thereof, the base defines a pair of substantially circular recesses 38 and 40, while the central portion of the base defines a substantially rectangular recess 42. A pair of vertically extending support walls 44 and 46 are provided on opposite sides of the recess 38 and a pair of vertically extending support walls 48 and 50 are provided on opposite sides of the recess 40, the walls 44, 46, 48 and 50 being integral with the base 36 in the embodiment of the invention illustrated.

In the embodiment of the invention illustrated, an odometer mechanism 52 is provided which is mounted on a frame 54 disposed in the recess 42 and secured to the base 36, as by screws 56. The odometer mechanism 52 is driven through a suitable gear train 58 by a shaft 60, the outer end of which is drivably connected to the speedometer cable 62, that extends into a fitting 64 projecting downwardly from the base 36.

As shown in Fig. 6, the speedometer 34 includes a magnetic drive, generally designated 66, which is comprised of a speed cup or drum 68 that is fixed to a spindle 70 by a hub member 72. One end of the spindle 70 is journaled for rotation in a bearing 74 carried by a screw-threaded member 76 which threadably engages a support plate 78. The opposite ends of the support plate are fixed to the upper ends of the walls 48 and 50, as by screws 80. The spindle extends into a recess 82 defined by a shaft 84, and the lower end of the spindle 70 is journaled in a bearing 86 mounted in the inner end of the recess 82. The shaft 84 is journaled for rotation in a bearing 88 carried by the base 36 and is provided with suitable teeth which engage and mesh with teeth on the shaft 60 that serves to drive the odometer mechanism. The shaft 84 is also drivably coupled to the speedometer cable in any desired or conventional manner so that the shaft 84 is driven at the same speed of rotation as the speedometer cable.

The magnetic drive 66 also includes a magnet 90 which is fixed to the shaft 84, and a pole piece 92 fixed to the side wall 50, as at 94. The drum 68 includes a peripheral flange portion 96 which is disposed between the magnet 90 and the pole piece 92, and rotation of the magnet 90 at a speed which is proportional to the speed of the vehicle generates eddy currents in the drum 68 that cause the drum to move angularly about the axis of the spindle 70, the angular movement of the drum 68 being proportional to the speed of the vehicle.

A drum 100 is provided at the opposite end of the base 36, the drum 100 being fixed to a spindle 102 by a hub member 104. One end of the spindle 102 is journaled in a bearing 106 carried by a screw-threaded member 108, the member 108, in turn, threadably engaging a support plate 110, the opposite ends of which are fixed to the upper ends of the walls 44 and 46, as by screws 112. The lower end of the spindle 102, as viewed in Figs. 3 and 5, is journaled for rotation in a bearing carried by the base 36.

A relatively thin, flexible, tape-like indicating member 114 is provided, one end portion of which is secured to the spindle 70, by a retaining element 115. The tape 114 extends out of the drum 68 through a slot 116 provided in the flange portion 96 of the drum 68, and the central portion of the tape extends longitudinally of the base 36 toward the drum 100. The tape 114 is also aligned with the slot 16 in the dial plate 14, the tape extending in spaced, substantially parallel relationship with respect to the dial plate so as to be visible through the slot 16. The tape is wound around the periphery of the flange portion 117 of the drum 100, and the end portion of the tape extends through a slot 118 provided in the flange portion 117 and is secured to the spindle 102 by a retaining element 115. It is preferred that the tape be relatively thin, in the order of 1/1000 of an inch thick, and that the tape have relatively high impact and tensile strength characteristics. It is also preferred that the tape maintain its flexibility throughout a wide temperature range, and have substantially the same co-efficient of expansion as the base 36. With such a construction, the indicating device is compensated for changes in the ambient temperature. One material suitable for this purpose is marketed under the trade-name "Mylar" by the E. I. duPont de Nemours Company, Wilmington, Delaware. It is understood that this material is a polyester film. The retaining elements 115 which secure the tape 114 to the spindles 70 and 102 are preferably formed of aluminum foil or other relatively thin flexible material of similar character. The retaining elements 115 are initially substantially V-shaped in cross section and have angularly extending flange portions 119 and 120 joined at one edge. In securing the tape 114 to the spindles 70 and 102, the end portions of the tape are placed intermediate the flange portions 119 and 120 of the retaining elements after which the tape and the retaining elements are wound tightly around the spindles 70 and 102 so as to secure the retaining elements and the tape to the spindles. Such a construction facilitates the rapid assembly of the speedometer during the production thereof with a minimum of labor and expense. Since the tape extends through the slots 116 and 118 and the opposite end portions of the tape are fixed to the spindles 70 and 102 by the retaining elements, when angular displacement of the drum 68 is effected by rotation of the magnet 90, the tape winds onto the flange portion 96 of the drum 68 and unwinds from the flange portion 117 of the drum 100, the tape moving longitudinally relative to the slot 16 and the scale 18. The tape 114 is provided with a reference line 121 which extends transversely of the tape in a direction substantially perpendicular to the longitudinal edge portions thereof and which may, for example, be a dividing line between sections of tape of contrasting color; which may be a slot in the tape; or which may be a dividing line between opaque and transparent sections of the tape. As the tape moves longitudinally of the slot, the reference line 121 also moves longitudinally of the scale 18 and is visible through the slot 16 so that the reference line may be associated with the scale to indicate changes in speed of the vehicle.

In order to provide a restoring force for the drum 100, a hairspring 122 is provided, one end of which bears against an upstanding flange 123 provided on an adjustable abutment stop 124 while the opposite end of the spring 122 is fixed to the spindle 102, as at 125. The abutment stop 124 includes a substantially flat portion 126 which bears against the support plate 110 and a generally cup-shaped resilient hub portion 128 which spacedly encompasses the member 108. A generally T-shaped nut 129 is provided having a reduced diameter portion 130 which projects through the resilient hub portion 128 of the abutment stop 124 and threadably engages the member 108, and a flange portion 131 which bears against the resilient hub portion 128 of the abutment stop so as to resiliently clamp the abutment stop in the selected adjusted position. A lock nut 132 is also provided to prevent rotation of the member 108, the nut 132 bearing against the lower surface of the support plate 110. With such a construction, the tension on the spring 122 may be adjusted to any desired value by varying the angular position of the member 124 relative to the spindle 102, and locking the member 124 in the selected adjusted position.

In order to overcome the inertia of the drums 68 and 100 and of the tape 114, it is preferred that the magnet 90 be relatively strong. It is also preferred that the drums 68 and 100 be formed of relatively thin-sectioned aluminum or other relatively lightweight electrically conducting material so as to reduce the inertia of the drums to a minimum.

In order that the reference line 121 may be initially adjusted relative to the scale 18, an adjustable abutment stop 134 is provided having a depending tang portion 136 which projects through an arcuate slot 138 provided in the support member 78, the tang being adapted to abut an upstanding flange 140 struck upwardly from the top wall 142 of the drum 68. The body portion 144 of the stop 134 is provided with an opening 146 through which the member 76 projects, and the stop is held in the angularly adjusted position by a screw 148 which passes through an arcuate slot 150 in the stop 134 and threadably engages the support member 78.

In the operation of the speedometer, when the vehicle is moving, the magnet 90 and pole piece 92 will effect angular movement of the drum 68 in a counterclockwise direction, as viewed in Fig. 4, the angular movement of the drum 68 being substantially directly proportional to the speed of the vehicle. For example, the drum 68 may rotate through an angle of 90 degrees when the vehicle reaches a speed of sixty miles per hour. As the drum 68 rotates, the tape 114 will unwind from the flange 117 of the drum 100 and simultaneously wind onto the flange 96 of the drum 68, with the result that the reference line 121 will move longitudinally of the scale 18, the line 121 being visible through the slot 16. As the tape 114 unwinds from the drum 100, the drum 100 will also rotate through an angle equal to the angular displacement of the drum 68. Assuming that the sections of the tape on opposite sides of the line 121 are of contrasting color, as, for example, red and black, respectively, a red ribbon will then move longitudinally of the slot 16 toward the drum 68.

If desired, a suitable source of light may be provided behind the tape 114, the light passing through the tape to provide an illuminated indication of the speed of the vehicle. In addition, instead of a line, a slot may be provided in the tape so that a relatively bright beam of light passes through the tape. Furthermore, one section of the tape may be made opaque and the other section transparent so that an illuminated ribbon of light moves longitudinally of the slot 16 as the speed of the vehicle varies. When the speed of the vehicle is reduced, the torque applied to the drum 68 through the agency of the magnet 90 and pole piece 92 will be reduced and the spring 122 will cause the drum 100 to rotate in a clockwise direction, as viewed in Fig. 4, with the result that the tape will wind onto the flange 117 of the drum 100 and will cause the drum 68 to rotate in a clockwise direction to restore the drum 68 to the angular position which corresponds to the speed of the vehicle.

As previously mentioned, it is preferred that the mass of the drums 68 and 100 and of the tape 114 be relatively low, and that the magnet 90 be relatively strong. Since the drums 68 and 100 rotate about parallel axes which are substantially vertical, the drums 68 and 100 and the tape 114 are stabilized against oscillation, due to the fact that acceleration and deceleration forces normal to the tape and vertical components of forces caused by pitching or bounding of the vehicle will not produce any substantial oscillation of the drums or the tape. It will be appreciated that acceleration and deceleration forces and forces produced by pitching and bouncing of the vehicle are the predominant forces exerted on automotive vehicles, forces produced by yawing or sidewise motion of automotive vehicles being relatively rare.

While a preferred embodiment of the invention has been shown and described, it will be understood that various changes and modifications may be made without departing from the spirit of the invention.

What is claimed is:

1. In a speedometer, the combination including a base, a pair of spaced rotatable drums formed of an electrically conductive material and each defining a rectangular slot in the periphery thereof, the longitudinal axis of the slot defined by each of said drums extending in a direction parallel to the axis of rotation of the drum, a pair of spaced substantially vertical spindles secured to said base, said drums being mounted for rotation on said spindles, an elongate relatively thin flexible tape having the opposite end portions thereof extending through said slots, metallic foil means securing the end portions of said tape to said spindles, magnetic signal responsive means for applying torque to one of said drums and adapted to cause the drum to assume an angular position indicative of the magnitude of the signal, a scale associated with said tape and graduated substantially proportionately to the relationship between the angular position of said drum and magnitude of the signal imposed by said signal responsive means, spring means for applying a restoring torque to the other of said drums, and means for adjusting the tension of said spring means.

2. In a speedometer, the combination including a base, a pair of spaced substantially vertical spindles secured to said base, a pair of rotatable drums each having a slot in the periphery thereof, at least one edge of the slot defined by each of said drums being straight and extending in a direction parallel to the axis of rotation thereof, one of said drums being mounted for rotation on each of said spindles, an elongate tape-like indicator having the opposite end portions thereof extending through said slots and contacting said straight edge thereof, a pair of metallic foil retaining members securing the opposite end portions of said indicator to said spindles, a rectilinear scale associated with said indicator and having substantially equally spaced graduations, a speed actuated magnetic coupling operatively associated with one of said drums, a spring connected to the other of said drums and adapted to apply a torque in opposition to the torque applied to said one drum by said magnetic coupling whereby said indicating member winds onto one of said drums and assumes a position which is substantially proportional to the speed being measured.

References Cited in the file of this patent

UNITED STATES PATENTS

| | | |
|---|---|---|
| 1,147,329 | Leathers | July 20, 1915 |
| 1,409,134 | Butterfield | Mar. 7, 1922 |
| 2,141,961 | Tornberg | Dec. 27, 1938 |
| 2,339,652 | Rockwood | Jan. 18, 1944 |
| 2,425,344 | Richards | Aug. 12, 1947 |
| 2,556,875 | Hallstrand | June 12, 1951 |

FOREIGN PATENTS

| | | |
|---|---|---|
| 220,428 | Germany | Mar. 21, 1908 |